United States Patent [19]

Hirano et al.

[11] 4,163,675

[45] Aug. 7, 1979

[54] AQUEOUS INK COMPOSITION FOR WRITING INSTRUMENTS

[75] Inventors: Katsumi Hirano, Kuwana; Takeshi Teranishi, Nagoya; Kunio Kosaki, Nagoya; Kazuhiko Honda, Nagoya, all of Japan

[73] Assignee: Pilot Ink Co., Ltd., Nagoya, Japan

[21] Appl. No.: 921,151

[22] Filed: Jun. 30, 1978

[30] Foreign Application Priority Data

Jun. 30, 1977 [JP] Japan ................................. 52-78188

[51] Int. Cl.$^2$ ...................... C09D 11/16; C09D 11/18
[52] U.S. Cl. ........................................ 106/22; 106/25; 260/29.6 B; 260/29.6 HN
[58] Field of Search ................ 106/22, 25; 260/29.6 B, 260/29.6 HN

[56] References Cited

U.S. PATENT DOCUMENTS

| Re. 28,605 | 11/1975 | Alburger | 106/19 |
| 3,519,443 | 7/1970 | Kaplan et al. | 106/22 |

Primary Examiner—Carman J. Seccuro
Attorney, Agent, or Firm—Sughrue, Rothwell, Mion, Zinn and Macpeak

[57] ABSTRACT

An aqueous ink composition, suitable for use in writing instruments including an ink passage made of a plastic material, consisting essentially of water, a water-soluble dye and a naphthalene derivative as essential ingredients and a glycol or a polyglycol as a moisture-retaining agent, a very small amount of a surface active agent as a penetrant, an anti-mold agent and other additives as optional ingredients. The naphthalene derivative imparts affinity for the plastic material.

8 Claims, No Drawings

AQUEOUS INK COMPOSITION FOR WRITING INSTRUMENTS

BACKGROUND OF THE INVENTION

1. Field of the Invention

This invention relates to an aqueous ink composition. More particularly, this invention relates to an aqueous ink composition for use in writing instruments including an ink passage made of a plastic material.

2. Description of the Prior Art

There are many examples of writing instruments in which an ink passage is made of a plastic material. Plastic molded articles are frequently used as nibs, feed elements or ink reservoirs in marking pens, as feed elements or ink reservoirs in fountain pens, and as tips, feed elements or ink reservoirs in ball-point pens for aqueous inks.

Most plastic materials intrinsically have low affinity for water, and are difficult to wet with aqueous inks. This frequently causes an interruption of ink flow in ink passages made of a plastic material. If a part which requires the presence of an extremely narrow ink flow channel, such as a nib or a feed element, is made of a plastic material, the channel width cannot be made narrow to the same extent as in a fibrous bundle, and, therefore, the capillary action in such a channel is weaker than in a fibrous bundle, thus, the tendency toward an interruption in ink flow increases. Accordingly, an "ink swallowing phenomenon" tends to occur in a writing instrument including such a plastic part whereby ink drops into the reservoir when the writing instrument has been left with the nib turned upside-down or when the instrument has been subjected to impact. As a result, the ability to write instantaneously after the occurrence of such a phenomenon becomes impossible, or inking failure tends to occur during writing. In a fountain pen including an ink cartridge made of a plastic material such as polyethylene, when the ink has been partly consumed to form a space within the cartridge, the wetting of the inner wall of the cartridge with the aqueous ink becomes poor. Hence, there is a tendency for the ink not to flow in the direction of the nib, but to remain within the cartridge.

Heretofore, the following techniques have been employed to use an aqueous ink in a writing instrument containing a part made of a plastic material.

(1) A surface active agent, as a wetting agent, is incorporated into the plastic material itself.

(2) A surface active agent is incorporated into the ink to increase the affinity of the ink for the plastic material.

(3) The surface of the plastic material is roughened by treatment chemically or with ozone.

When technique (1) above is used, the surface active agent is frequently extracted into the ink when ink is contacted with the plastic material for long periods of time. Thus, blotting occurs frequently with such an ink.

If a surface active agent is added in an amount sufficient to wet the plastic material as in technique (2) above, the writing tends to blot on the paper to a great extent.

In technique (3) above, roughening the surface of the plastic portion of the writing instrument involves difficulties. Treatment of a fine channel in the nib or feed element is time-consuming, and complete treatment is extremely difficult to accomplish.

SUMMARY OF THE INVENTION

An object of the present invention is to provide an aqueous ink composition suitable for writing instruments including an ink passage made of a plastic material.

It has now been found that the incorporation of about 0.1 to about 10% by weight of a specific naphthalene derivative in an aqueous ink makes it possible to increase the affinity of the aqueous ink for the plastic material and to render the plastic material readily wettable without markedly decreasing the surface tension of the aqueous ink. Accordingly, when the aqueous ink of the invention is employed in a writing instrument, the writing does not blot on paper, and an interruption of the ink flow, which occurs due to the lack of affinity of the ink for the plastic material of the ink passage of the writing instrument, is obviated.

The above-described object of the invention is achieved by an aqueous ink composition consisting essentially of water, a water-soluble dye and a naphthalene derivative of the following general formula (I):

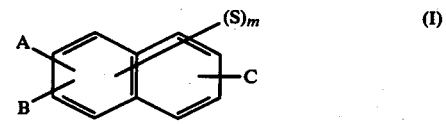

wherein S represents $-SO_3M$ or $-COOM$ in which M represents H, an alkali metal atom or $NH_4$; m is 1, 2, 3, or 4; and A, B and C, which may be the same or different, each represents $-H$, $-OR_1$,

$-NO$, $-NO_2$ or $-N\equiv N^+$, in which $R_1$ and $R_2$, which may be the same or different, each represents $-H$, $-C_nH_{2n+1}$,

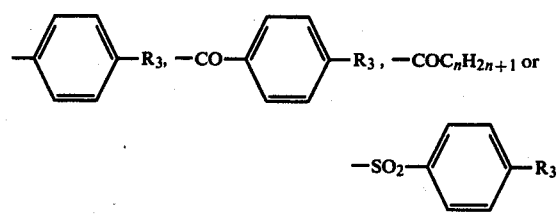

in which $R_3$ represents $-H$, $-C_nH_{2n+1}$, $-NO_2$, $-NH_2$, $-OH$ or $-COOH$ and n is a number of 1 to 9.

DETAILED DESCRIPTION OF THE INVENTION

Suitable dyes which can be used as colorants in the present invention are water-soluble dyes, e.g., having a solubility in water of about $10^{-3}$ mole/l or more, preferably about $10^{-2}$ mole/l or more, at 20° to 25° C., which are generally classified as acid dyes and direct dyes. The water-soluble dye is used in an amount of about 1 to about 15% by weight, preferably 3 to 10% by weight, based on the total weight of the ink composition.

Specific examples of suitable water-soluble dyes which can be used are acid dyes such as Tartrazine (CI 19140), Quinoline Yellow (CI 47005), Eosin (CI 45380), Acid Phloxine (CI 45410), Erythrosine (CI 45430), Sunset Yellow FCF (CI 15985), Acid Violet 5B (CI 42640), Patent Blue AF (CI 42080), Brilliant Cyanine 6B (CI 42660), Acid Brilliant Blue FCF (CI 42090), Naphthalene Green VSC (CI 44025) and Acid Blue Black 10B (CI 20470); and direct dyes such as Paper Yellow GG (CI Direct Yellow 131), Direct Scarlet 4BS (CI 29160), Congo Red (CI 22120), Violet BB (CI 27905), Direct Sky Blue 5B (CI 24400), Phthalocyanine Blue (CI 74180), Black G (CI 35255) and Deep Black XA (CI Direct Black 154). The CI number in the description above indicates the identification number in the *Color Index*, 3rd Ed., The Society of Dyers and Colorists, Bradford, Yorkshire (1971).

The naphthalene derivative of the general formula (I) is employed in the ink composition of this invention in an amount of about 0.1 to about 10% by weight, preferably 0.3 to 7.0% by weight, and most preferably 0.5 to 3.0% by weight, based on the total weight of the ink composition. Amounts less than about 0.1% by weight do not produce any appreciable effect as shown by the experimental results given hereinbelow. On the other hand, if the amount of the naphthalene derivative exceeds about 10% by weight, the solids content of the ink increases, and solid tends to precipitate, with the result that ink flow through a capillary ink passage of a writing instrument is impaired.

Those naphthalene derivatives of the general formula (I) which are present in the acid form and are only sparingly soluble in water are used dissolved in the form of a salt in water together with basic substances such as alkali metal hydroxides, alkali metal carbonates or ammonium hydroxide, to assist in dissolving the naphthalene derivatives. A suitable amount of these basic substances as naphthalene derivative dissolving aids is about 1 to 2 times, in terms of chemical equivalent ratio, the amount of the naphthalene derivative.

Specific examples of naphthalene derivatives of the general formula (I) which can be used in this invention include the following compounds and the alkali metal salts or ammonium salts thereof.

(1) Naphthalenemonosulfonic Acids:

1-Naphthalenesulfonic acid
2-Naphthalenesulfonic acid (2) Naphthalenedisulfonic Acids:

Naphthalene-1,5-disulfonic acid (γ-naphthalenedisulfonic acid)
Naphthalene-2,6-disulfonic acid (β-naphthalenedisulfonic acid)
Naphthalene-2,7-disulfonic acid (α-naphthalenedisulfonic acid)

(3) Naphthalenetrisulfonic Acids:

Naphthalene-1,3,6-trisulfonic acid (4) Naphtholsulfonic Acids:

1-Naphthol-2-sulfonic acid
1-Naphthol-3-sulfonic acid
1-Naphthol-4-sulfonic acid (NW acid)
1-Naphthol-5-sulfonic acid (L acid)
1-Naphthol-6-sulfonic acid
1-Naphthol-7-sulfonic acid
1-Naphthol-8-sulfonic acid
2-Naphthol-1-sulfonic acid (oxy Tobias acid)
2-Naphthol-3-sulfonic acid
2-Naphthol-4-sulfonic acid
2-Naphthol-5-sulfonic acid
2-Naphthol-6-sulfonic acid (Schäffer's acid)
2-Naphthol-7-sulfonic acid (F acid)
2-Naphthol-8-sulfonic acid (Crocein acid)

(5) Naphtholdisulfonic Acids:

1-Naphthol-2,4-disulfonic acid
1-Naphthol-2,5-disulfonic acid
1-Naphthol-2,7-disulfonic acid
1-Naphthol-3,6-disulfonic acid (Violet acid)
1-Naphthol-3,7-disulfonic acid
1-Naphthol-3,8-disulfonic acid (εacid)
1-Naphthol-4,7-disulfonic acid
1-Naphthol-4,8-disulfonic acid
1-Naphthol-6,8-disulfonic acid
2-Naphthol-1,4-disulfonic acid
2-Naphthol-1,5-disulfonic acid
2-Naphthol-1,6-disulfonic acid
2-Naphthol-1,7-disulfonic acid
2-Naphthol-3,6-disulfonic acid (R acid)
2-Naphthol-3,7-disulfonic acid
2-Naphthol-4,8-disulfonic acid
2-Naphthol-6,8-disulfonic acid (G acid)

(6) Naphthol-trisulfonic Acids:

1-naphthol-2,4,7-trisulfonic acid
1-Naphthol-2,4,8-trisulfonic acid
1-Naphthol-3,6,8-trisulfonic acid (oxy Koch's acid)

(7) Naphthylaminesulfonic Acids:

1-Naphthylamine-2-sulfonic acid
1-Naphthylamine-3-sulfonic acid (Cleve's γ-acid)
1-Naphthylamine-4-sulfonic acid (naphthionic acid)
1-Naphthylamine-5-sulfonic acid (Laurent's acid)
1-Naphthylamine-6-sulfonic acid (Cleve's acid)
1-Naphthylamine-7-sulfonic acid (7-Cleve's acid)
1-Naphthylamine-8-sulfonic acid (Peri acid)
2-Naphthylamine-1-sulfonic acid (Tobias acid)
2-Naphthylamine-4-sulfonic acid
2-Naphthylamine-5-sulfonic acid (Dahl's acid)
2-Naphthylamine-6-sulfonic acid (Brönner acid)
2-Naphthylamine-7-sulfonic acid
2-Naphthylamine-8-sulfonic acid (Badische acid)

(8) Naphthylamine-disulfonic Acids:

1-Naphthylamine-2,4-disulfonic acid
1-Naphthylamine-2,5-disulfonic acid
1-Naphthylamine-2,7-disulfonic acid
1-Naphthylamine-2,8-disulfonic acid
1-Naphthylamine-3,5-disulfonic acid
1-Naphthylamine-3,6-disulfonic acid (Freund's acid)
1-Naphthylamine-3,7-disulfonic acid
1-Naphthylamine-3,8-disulfonic acid
1-Naphthylamine-4,6-disulfonic acid (Dahl's acid II)
1-Naphthylamine-4,7-disulfonic acid (Dahl's acid III)
1-Naphthylamine-4,8-disulfonic acid
1-Naphthylamine-5,7-disulfonic acid
1-Naphthylamine-5,8-disulfonic acid
2-Naphthylamine-1,5-disulfonic acid
2-Naphthylamine-1,6-disulfonic acid 2-Naphthylamine-1,7-disulfonic acid
2-Naphthylamine-3,6-disulfonic acid (amino R-acid)
2-Naphthylamine-3,7-disulfonic acid
2-Naphthylamine-4,7-disulfonic acid
2-Naphthylamine-4,8-disulfonic acid
2-Naphthylamine-5,7-disulfonic acid (amino J-acid)
2-Naphthylamine-6,8-disulfonic acid (amino G-acid)

(9) Naphthylamine-trisulfonic Acids:

1-Naphthylamine-2,4,6-trisulfonic acid
1-Naphthylamine-2,4,7-trisulfonic acid
1-Naphthylamine-2,5,7-trisulfonic acid
1-Naphthylamine-3,6,8-trisulfonic acid (Koch's acid)
1-Naphthylamine-4,6,8-trisulfonic acid
2-Naphthylamine-3,6,8-trisulfonic acid

(10) Dihydroxynaphthalenesulfonic Acids:

1,8-Dihydroxynaphthalene-3-sulfonic acid
1,6-Dihydroxynaphthalene-3-sulfonic acid
1,7-Dihydroxynaphthalene-3-sulfonic acid
1,8-Dihydroxynaphthalene-4-sulfonic acid
2,3-Dihydroxynaphthalene-6-sulfonic acid (dioxy R-acid)
1,7-Dihydroxynaphthalene-3-sulfonic acid (dioxy G-acid)

(11) Dihydroxynaphthalenedisulfonic Acids:

1,2-Dihydroxynaphthalene-3,6-disulfonic acid
1,3-Dihydroxynaphthalene-5,7-disulfonic acid
1,5-Dihydroxynaphthalene-2,4-disulfonic acid
1,8-Dihydroxynaphthalene-3,5-disulfonic acid
1,8-Dihydroxynaphthalene-3,6-disulfonic acid (chromotropic acid)
2,7-Dihydroxynaphthalene-3,6-disulfonic acid

(12) Aminonaphthol-sulfonic Acids:

1-Amino-2-naphthol-4-sulfonic acid (1,2,4-acid)
1-Amino-2-naphthol-6-sulfonic acid
5-Amino-1-naphthol-2-sulfonic acid (M-acid)
1-Amino-7-naphthol-3-sulfonic acid
1-Amino-8-naphthol-4-sulfonic acid (S-acid)
8-Amino-1-naphthol-4-sulfonic acid
2-Amino-3-naphthol-6-sulfonic acid
2-Amino-5-naphthol-7-sulfonic acid (J-acid)
2-Amino-8-naphthol-6-sulfonic acid (γ-acid)

(13) Aminonaphthol-disulfonic Acids:

1-Amino-2-naphthol-3,6-disulfonic acid
1-Amino-8-naphthol-2,4-disulfonic acid (SS-acid)
1-Amino-8-naphthol-3,5-disulfonic acid (B-acid)
1-Amino-8-naphthol-3,6-disulfonic acid (H-acid)
1-Amino-8-naphthol-4,6-disulfonic acid (K-acid)
1-Amino-8-naphthol-5,7-disulfonic acid
2-Amino-1-naphthol-4,8-disulfonic acid
2-Amino-8-naphthol-3,6-disulfonic acid (RR-acid)

(14) Naphthylenediaminesulfonic Acids:

1,2-Naphthylenediamine-3-sulfonic acid
1,2-Naphthylenediamine-4-sulfonic acid
1,2-Naphthylenediamine-5-sulfonic acid
1,2-Naphthylenediamine-6-sulfonic acid
1,2-Naphthylenediamine-7-sulfonic acid
1,3-Naphthylenediamine-5-sulfonic acid
1,3-Naphthylenediamine-6-sulfonic acid
1,4-Naphthylenediamine-2-sulfonic acid
1,4-Naphthylenediamine-5-sulfonic acid
1,4-Naphthylenediamine-6-sulfonic acid
1,5-Naphthylenediamine-2-sulfonic acid
1,5-Naphthylenediamine-4-sulfonic acid
1,6-Naphthylenediamine-4-sulfonic acid
1,8-Naphthylenediamine-4-sulfonic acid

(15) Naphthylenediaminedisulfonic Acids:

1,8-Naphthylenediamine-3,6-disulfonic acid
1,8-Naphthylenediamine-4,5-disulfonic acid

(16) N-Substituted-aminonaphthalenesulfonic Acids:

8-N-Phenylamino-1-naphthalenesulfonic acid (phenyl Peri acid)
8-N-Tolylamino-1-naphthalenesulfonic acid (N-p-tolyl Peri acid)
6,8-N,N'-Di(phenylamino)-1-naphthalenesulfonic acid (diphenyl ε-acid)
5-Amino-8-N-(p-hydroxyphenyl)amino-2-naphthalenesulfonic acid (6-Cleve's acid-indophenol)
8-Amino-5-N-(p-hydroxyphenyl)amino-2-naphthalenesulfonic acid (7-Cleve's acid-indophenol)
5-N-(p-Hydroxyphenyl)amino-8-N-phenylamino-1-naphthalenesulfonic acid (phenyl Peri acid-indophenol)

(17) N-Substituted-aminohydroxynaphthalenesulfonic Acids:

7-N-Acetylamino-4-hydroxy-2-naphthalenesulfonic acid (N-acetyl J-acid)
7-N-Methylamino-4-hydroxy-2-naphthalenesulfonic acid (N-methyl J-acid)
7-N-Phenylamino-4-hydroxy-2-naphthalenesulfonic acid (N-phenyl J-acid)
7-N-Benzoylamino-4-hydroxy-2-naphthalenesulfonic acid (N-benzoyl J-acid)
7-N-(m-Aminobenzoyl)amino-4-hydroxy-2-naphthalenesulfonic acid (m-aminobenzoyl J-acid)
7-N-(p-Aminobenzoyl)amino-4-hydroxy-2-naphthalenesulfonic acid (p-aminobenzoyl J-acid)
7-N-(m-Nitrobenzoyl)amino-4-hydroxy-2-naphthalenesulfonic acid (m-nitrobenzoyl J-acid)
7-N-(p-Nitrobenzoyl)amino-4-hydroxy-2-naphthalenesulfonic acid (p-nitrobenzoyl J-acid)
6-N-Dimethylamino-4-hydroxy-2-naphthalenesulfonic acid (N-dimethyl γ-acid)
6-N-Phenylamino-4-hydroxy-2-naphthalenesulfonic acid (N-phenyl γ-acid)
6-N-(p-Carboxyphenyl)amino-4-hydroxy-2-naphthalenesulfonic acid (N-p-carboxyphenyl γ-acid)
6-N-Benzoylamino-4-hydroxy-2-naphthalenesulfonic acid (N-benzoyl γ-acid)
4-N-Benzoylamino-5-hydroxy-1,7-naphthalenedisulfonic acid (N-benzoyl K-acid)
4-N-Benzoylamino-5-hydroxy-1-naphthalenesulfonic acid (N-benzoyl S-acid)
4-N-Acetylamino-5-hydroxy-2,7-naphthalenedisulfonic acid (N-acetyl H-acid)
4-N-Benzoylamino-5-hydroxy-2,7-naphthalenedisulfonic acid (N-benzoyl H-acid)
4-N-Phenylsulfonylamino-5-hydroxy-2,7-naphthalenesulfonic acid (N-benzenesulfonyl H-acid)

(18) Naphthalenecarboxylic Acids:

1-Naphthalenecarboxylic acid (α-naphthoic acid)
2-Naphthalenecarboxylic acid (β-naphthoic acid)

(19) Naphthalenedicarboxylic Acids:

1,2-Naphthalenedicarboxylic acid
Naphthalene-1,3-dicarboxylic acid
Naphthalene-1,4-dicarboxylic acid
Naphthalene-1,5-dicarboxylic acid
Naphthalene-1,6-dicarboxylic acid
Naphthalene-1,7-dicarboxylic acid
Naphthalene-1,8-dicarboxylic acid
Naphthalene-2,3-dicarboxylic acid
Naphthalene-2,6-dicarboxylic acid
Naphthalene-2,7-dicarboxylic acid

(20) Naphthalenetetracarboxylic Acids:

Naphthalene-1,4,5,8-tetracarboxylic acid

(21) Hydroxynaphthoic Acids:

2-Hydroxy-1-naphthoic acid
3-Hydroxy-1-naphthoic acid
4-Hydroxy-1-naphthoic acid
5-Hydroxy-1-naphthoic acid
6-Hydroxy-1-naphthoic acid
7-Hydroxy-1-naphthoic acid
8-Hydroxy-1-naphthoic acid
1-Hydroxy-2-naphthoic acid
3-Hydroxy-2-naphthoic acid
4-Hydroxy-2-naphthoic acid
5-Hydroxy-2-naphthoic acid
6-Hydroxy-2-naphthoic acid
7-Hydroxy-2-naphthoic acid
8-Hydroxy-2-naphthoic acid

(22) Other Naphthalene Derivatives:

6-(2,4-Diaminophenoxy)-2-naphthalenesulfonic acid
4-Ethoxy-5-hydroxy-2,7-naphthalenedisulfonic acid (ethoxychromotropic acid)
5-Amino-6-ethoxy-2-naphthalenesulfonic acid (ethoxy Cleve's acid)
4-Amino-5-phenylsulfonyloxy-2,7-naphthalenedisulfonic acid (O-benzenesulfonyl H-acid)
4-Diazonium-3-hydroxy-1-naphthalenedisulfonic acid (diazo-1,2,3-acid)
3-Hydroxy-4-nitroso-2,7-naphthalenesulfonic acid Of the naphthalene derivatives of the general formula (I) above, those naphthalene derivatives of the following general formula (II) produce the best results, and are, therefore, preferred in the present invention.

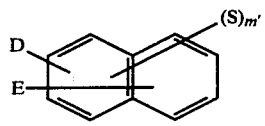 (II)

In the general formula (II), S represents —SO₃M' or —COOM' in which M' represents H, Na or K, and m' is 1 or 2; and D and E, which may be the same or different, each represents —H, —OH or

in which $R_4$ and $R_5$, which may be the same or different, each represents —H, —$C_nH_{2n+1}$, —$COC_nH_{2n+1}$,

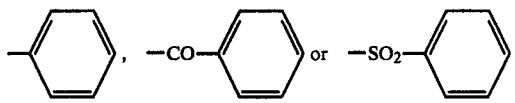

in which n is 1 to 9; and with the proviso that D and E are not —H simultaneously.

Typical examples of the naphthalene derivatives of the general formula (II) are as follows:

5-Amino-1-naphthalenesulfonic acid
8-N-Phenylamino-1-naphthalenesulfonic acid
5-Amino-2-naphthalenesulfonic acid
6-Amino-2-naphthalenesulfonic acid
3-Amino-2,7-naphthalenedisulfonic acid
6,8-N,N'-Di(phenylamino)-1-naphthalenesulfonic acid
8-Hydroxy-1,6-naphthalenedisulfonic acid
4,5-Dihydroxy-2,7-naphthalenedisulfonic acid
7-Amino-4-hydroxy-2-naphthalenesulfonic acid
7-N-Acetylamino-4-hydroxy-2-naphthalenesulfonic acid
7-N-Methylamino-4-hydroxy-2-naphthalenesulfonic acid
5-Amino-1-hydroxy-2-naphthalenesulfonic acid
6-Amino-4-hydroxy-2-naphthalenesulfonic acid
6-N-Benzoylamino-4-hydroxy-2-naphthalenesulfonic acid
6-N-(p-Carboxyphenyl)amino-4-hydroxy-2-naphthalenesulfonic acid
4-Amino-5-hydroxy-1,7-naphthalenedisulfonic acid
4-N-Benzoylamino-5-hydroxy-1,7-naphthalenedisulfonic acid In addition to the above-described essential ingredients, the aqueous ink composition of this invention may also contain a moisture-retaining agent such as a glycol or a polyglycol, a very small amount of a surface active agent, an anti-mold agent and other additives as optional ingredients.

Suitable moisture-retaining agents which can be used in the aqueous ink composition of the present invention include glycols (such as ethylene glycol, propylene glycol, 1,3-butylene glycol, glycerol, etc.) and polyglycols (such as diethylene glycol, thiodiethylene glycol, triethylene glycol, polyethylene glycol having a molecular weight of 400 to 1,000, etc.). A suitable amount of the moisture-retaining agent when used in the aqueous ink composition of the present invention ranges from about 0.5 to about 30% by weight based on the total weight of the aqueous ink composition.

Suitable surface active agents which can be used in the aqueous ink composition of the present invention include anionic surfactants such as sodium alkylnaphthalene sulfonate, sodium dodecyl diphenyl ether disulfonate, sodium dioctylsulfosuccinate, etc. A suitable amount of the surface active agent when used in the aqueous ink composition of the present invention (on an active ingredient basis) is up to about 0.01 to 0.2% by weight based on the total weight of the aqueous ink composition.

Suitable anti-mold agents which can be used in the aqueous ink composition of the present invention include phenol, sodium benzoate and sodium dehydroacetate. A suitable amount of the anti-mold agent when used in the aqueous ink composition of the present invention ranges from about 0.1 to about 1.0% by weight based on the total weight of the aqueous ink composition.

Other additives which can be present in the aqueous ink composition of the present invention include thickeners for inks such as dextrin and water-soluble polymers (e.g., polyvinyl pyrrolidone, polyvinyl alcohol, etc.). A suitable amount of the ink thickener when used in the aqueous ink composition of the present invention ranges from about 0.5 to about 5.0% by weight based on the total weight of the aqueous ink composition.

The aqueous ink composition of the present invention can be prepared by the following process. The water-soluble dye or a mixture thereof is added to water or a water-soluble vehicle in which a moisture-retaining agent or thickener is dissolved in water and the resulting mixture is heated at about 40° to about 90° C. with stirring to dissolve and mix the components and obtain a dye solution. A naphthalene derivative, alone or as a combination thereof, is dissolved alone or together with a naphthalene derivative dissolving aid in water with stirring to obtain a naphthalene derivative aqueous solution. The naphthalene derivative aqueous solution is mixed uniformly with the dye solution to produce the aqueous ink composition of the present invention. When a surfactant and/or an anti-mold agent is used, they can be added to the aqueous ink composition and mixed uniformly with stirring and, thereby, the aqueous ink composition produced. If desired, the aqueous ink composition may be filtered with filter paper or cotton fabric.

The following Examples are given to illustrate the present invention in greater detail. All parts in these examples are by weight, unless otherwise indicated.

[I] Ink Compounding and Preparation (a) Red Ink-No. 1 Series (Examples 1 to 11 and 59 to 70)

|  | parts |
|---|---|
| Eosin GH (acid dye, C.I. Acid Red 87, C.I. 45380, a product of Hodogaya Chemical Co., Ltd.) | 3.5 |
| Acid Phloxine (acid dye, C.I. Acid Red 92, C.I. 45410, a product of Hodogaya Chemical Co., Ltd.) | 2.0 |
| Paper Yellow GG (direct dye, C.I. Direct Yellow 131, a product of Bayer AG) | 2.0 |
| Glycerol | 10.0 |
| Ethylene Glycol | 10.0 |
| Dowfax 2A1 (a 45% aqueous solution of sodium dodecylated diphenyl ether disulfonate, an anionic surfactant, made by Dow Chemical) | 0.3 |
| Phenol | 0.4 |
| Naphthalene Derivative* | Table 1 |
| Naphthalene Derivative Dissolving Aid* | Table 1 |
| Water to make | 100 |

*Type and amount as shown in Table 1 below, hereinafter the same.

In accordance with the above formulation to prepare each ink, 10 parts of glycerol and 10 parts of ethylene glycol were first mixed with about 20 parts of water. To the resulting solution were added 3.5 parts of Eosin GH, 2.0 parts of Acid Phloxine and 2.0 parts of Paper Yellow GG, and the mixture was heated at 60° C. for 30 minutes with stirring. A solution of each of the naphthalene derivative and the naphthalene derivative dissolving aid in about 20 parts of water was added thereto and the mixture mixed with stirring. Then, 0.3 part of Dowfax 2A1 and 0.4 part of phenol were added thereto, and water was further added to make the total amount 100 parts to form a uniformly dissolved No. 1 series red ink.

(b) Red Ink-No. 2 Series (Examples 12 to 20 and 71 to 79)

|  | parts |
|---|---|
| Direct Fast Scarlet 4BS (direct dye, C.I. Direct Red 23, C.I. 29160, a product of Hodogaya Chemical Co., Ltd.) | 4.0 |
| Paper Orange GGL 143% (direct dye, a product of Bayer AG) | 5.2 |
| Diethylene Glycol | 15.0 |
| Ethylene Glycol | 5.0 |
| Rapizol B-30 (a 30% aqueous solution of sodium dioctylsulfosuccinate, an anionic surfactant, a product of Nippon Yushi K.K.) | 0.2 |
| Sodium Benzoate | 0.8 |
| Naphthalene Derivative | Table 1 |
| Naphthalene Derivative Dissolving Aid | Table 1 |
| Water to make | 100 |

In accordance with the above formulation to prepare each ink, 15.0 parts of diethylene glycol, 5.0 parts of ethylene glycol and about 20 parts of water were mixed. To the resulting solution were added 4.0 parts of Direct Fast Scarlet 4BS and 5.2 parts of Paper Orange GGL 143%. The mixture was heated at 80° C. for 30 minutes with stirring. A solution of the naphthalene derivative and the naphthalene derivative dissolving aid in about 20 parts of water was added thereto, and the mixture mixed with stirring. Further, 0.2 part of Rapizol B-30 and 0.8 part of sodium benzoate were added thereto, and 100 parts of water to prepare a No. 2 series red ink.

(c) Blue Ink Series (Examples 21 to 25 and 80 to 84)

|  | parts |
|---|---|
| Acid Brilliant Blue FCF (acid dye, C.I. Acid Blue 9, C.I. 42090, a product of Hodogaya Chemical Co., Ltd.) | 6.5 |
| Thiodiethylene Glycol | 10.0 |
| Ethylene Glycol | 5.0 |
| Phenol | 0.3 |
| Rapizol B-30 | 0.3 |
| Naphthalene Derivative | Table 1 |
| Naphthalene Derivative Dissolving Aid | Table 1 |
| Water to make | 100 |

These ingredients were formulated in accordance with (b) above.

(d) Green Ink Series (Examples 26 to 30 and 85 to 89)

|  | parts |
|---|---|
| Naphthalene Green VSC (acid dye, C.I. Acid Green 16, C.I. 44025, a product of Sumitomo Mikuni Sha) | 6.2 |
| Glycerol | 5.0 |
| Diethylene Glycol | 10.0 |
| Phenol | 0.5 |
| Rapizol B-30 | 0.3 |

| | parts |
|---|---|
| Naphthalene Derivative | Table 1 |
| Naphthalene Derivative Dissolving Aid | Table 1 |
| Water to make | 100 |

These ingredients were formulated in accordance with (b) above.

(e) Violet Ink Series (Examples 31 to 35 and 90 to 95)

| | parts |
|---|---|
| Acid Violet 6B (acid dye, C.I. Acid Red 49, C.I. 42640, a product of Hodogaya Chemical Co., Ltd.) | 5.0 |
| Diethylene Glycol | 15.0 |
| Sodium Benzoate | 0.6 |
| Naphthalene Derivative | Table 1 |
| Naphthalene Derivative Dissolving Aid | Table 1 |
| Water to make | 100 |

The above ingredients were formulated in accordance with (b) above.

(f) Yellow Ink Series (Examples 36 to 40 and 96 to 100)

| | parts |
|---|---|
| Tartrazine Conc. (acid dye, C.I. Acid Yellow 23, C.I. 19140) | 3.0 |
| Diethylene Glycol | 5.0 |
| Thiodiethylene Glycol | 5.0 |
| Phenol | 0.4 |
| Naphthalene Derivative | Table 1 |
| Naphthalene Derivative Dissolving Aid | Table 1 |
| Water to make | 100 |

The above ingredients were formulated in accordance with (b) above.

(g) Black Ink-No. 1 Series (Examples 41 to 50 and 101 to 110)

| | parts |
|---|---|
| Acid Phloxine | 1.6 |
| Sunset Yellow FCF (acid dye, C.I. Food Yellow 3, C.I. 15985) | 2.0 |
| Acid Brilliant Blue FCF | 4.4 |
| Propylene Glycol | 10.0 |
| Diethylene Glycol | 15.0 |
| Phenol | 0.2 |
| Dowfax 2A1 | 0.3 |
| Naphthalene Derivative | Table 1 |
| Naphthalene Derivative Dissolving Aid | Table 1 |
| Water to make | 100 |

These ingredients were formulated in accordance with (b) above.

(h) Black Ink-No. 2 Series (Examples 51 to 58 and 111 to 118)

| | parts |
|---|---|
| Water Black #186 (acid dye, C.I. Acid Black 1, C.I. 20470, a product of Orient Chemical Co., Ltd.) | 7.0 |
| Glycerol | 5.0 |
| Thiodiethylene Glycol | 10.0 |
| Sodium Benzoate | 0.5 |
| Rapizol B-30 | 0.2 |
| Naphthalene Derivative | Table 1 |
| Naphthalene Derivative Dissolving Aid | Table 1 |
| Water to make | 100 |

These ingredients were formulated in accordance with (b) above.

Comparative inks for each of inks of types (a) to (h) above were also prepared without using the naphthalene derivative and the naphthalene derivative dissolving aid. The comparative ink of Comparative Examples A-2 and B-2 contained a naphthalene derivative and a dissolving aid therefor except an amount equivalent to only 0.05% by weight of the naphthalene derivative was used.

[II] Test Methods and Results

The ink prepared in each of the examples was tested using the testing methods described below in comparison with comparative inks for each series.

(1) Writing Test Instruments (a) Marking Pen

A pen consisting of a holder and a pen nib made of polyacetal and having fine ink channels in the longitudinal direction of the holder with the rear end of the nib being inserted in the forward end of an ink retainer composed of a fiber bundle within the holder. The ink retainer was filled with a fixed amount of the ink in each of the examples. Pens of this structure were used in the tests after confirmation writing was possible.

(b) Ball-Point Pen for Aqueous Inks

A ball-point pen consisting of a holder, a tip of polyacetal holding the ball of the pen point and having fine ink channels in the longitudinal direction of the holder, and a feeder rod composed of a resin-finished fiber bundle which connected the tip to an ink retainer composed of a fiber bundle within the holder. The ink retainer was filled with a fixed amount of the ink in each of the examples. Pens of this type were used in the tests after confirmation writing was possible.

(2) Testing Method ("Ink Swallowing Test")

Fifty writing instruments for each ink were sealed, and left for 10 days with the writing tips turned upside-down. Then, the instruments were written with to examine whether writing could be produced immediately.

(3) Test Results

Table 1 shows the types and amounts of the naphthalene derivatives and naphthalene derivative dissolving aids incorporated in the inks, and the test results obtained.

Table 1

Summary of Test Results

| | Type of Ink | Compound and Amounts | | | | Results of "Ink[1] Swallowing Test" (no. poor/50 samples) |
|---|---|---|---|---|---|---|
| | | Naphthalene Derivative (parts) | | Dissolving Aid (parts) | | |
| (a) | Red Ink-No. 1 Series | | | | | |
| | Comparative Example A-1 | Not added | — | Not added | — | 11 |
| | Comparative Example A-2 | L-acid | 0.05 | $Na_2CO_3$ | 0.01 | 12 |
| | Example 1 | L-acid | 0.5 | $Na_2CO_3$ | 0.1 | 5 |
| | " 2 | Freund's acid | 3.0 | NaOH | 1.2 | 3 |
| | " 3 | H-acid | 1.0 | KOH | 1.5 | 4 |
| | " 4 | Ethoxy Cleve's acid | 5.0 | $Na_2CO_3$ | 1.0 | 2 |
| | " 5 | α-Naphthoic acid | 0.8 | NaOH | 0.2 | 3 |
| | " 6 | Dioxy G-acid | 0.1 | $Na_2CO_3$ | 0.02 | 4 |
| | " 7 | Acetyl J-acid | 4.0 | $Na_2CO_3$ | 1.0 | 1 |
| | " 8 | M-acid | 1.5 | KOH | 0.15 | 2 |
| | " 9 | Cleve's acid | 0.8 | LiOH | 0.08 | 0 |
| | " 10 | G-acid | 0.7 | NaOH | 0.3 | 4 |
| | " 11 | Laurent's acid Phenyl Peri acid | 0.5 1.5 | NaOH | 0.4 | 1 |
| (b) | Red Ink-No. 2 Series | | | | | |
| | Comparative Example B-1 | Not added | — | Not added | — | 8 |
| | Example 12 | 1-Naphthol 8-sulfonic acid | 3.0 | $Na_2CO_3$ | 0.8 | 2 |
| | " 13 | Amino R-acid | 1.5 | $Na_2CO_3$ | 0.7 | 0 |
| | " 14 | RR-acid | 0.5 | $Na_2CO_3$ | 0.3 | 2 |
| | " 15 | Ethoxychromotropic acid | 0.3 | $Na_2CO_3$ | 0.2 | 2 |
| | " 16 | Naphthalene-1,5-disulfonic acid | 1.5 | KOH | 0.7 | 4 |
| | " 17 | γ-Acid | 0.8 | KOH | 0.2 | 2 |
| | " 18 | R-acid | 2.0 | KOH | 1.0 | 0 |
| | " 19 | Tobias acid | 4.0 | KOH | 1.0 | 4 |
| | " 20 | Naphthionic acid Chromotropic acid | 0.8 1.0 | NaOH | 0.5 | 1 |
| (c) | Blue Ink Series | | | | | |
| | Comparative Example C | Not added | — | Not added | — | 14 |
| | Example 21 | NW-acid | 1.0 | KOH | 0.2 | 4 |
| | " 22 | Amino J-acid | 2.0 | KOH | 1.0 | 3 |
| | " 23 | Sulfo J-acid | 0.5 | KOH | 0.3 | 2 |
| | " 24 | O-benzenesulfonyl H-acid | 0.8 | KOH | 0.4 | 1 |
| | " 25 | 2-Oxy-1-naphthoic acid | 3.0 | KOH | 0.7 | 3 |
| (d) | Green Ink Series | | | | | |
| | Comparative Example D | Not added | — | Not added | — | 12 |
| | Example 26 | Schaffer's acid | 2.0 | NaOH | 0.4 | 2 |
| | " 27 | C-acid | 0.7 | NaOH | 0.6 | 4 |
| | " 28 | Phenyl J-acid | 1.5 | LiOH | 0.1 | 1 |
| | " 29 | 6-Cleve's acid indophenol | 4.0 | LiOH | 0.4 | 2 |
| | " 30 | α-Naphthalene-sulfonic acid | 0.8 | LiOH | 0.1 | 5 |
| (e) | Violet Ink Series | | | | | |
| | Comparative Example E | Not added | — | Not added | — | 11 |
| | Example 31 | Crocein acid | 0.8 | $Na_2CO_3$ | 0.2 | 2 |
| | " 32 | Amino G-acid | 3.0 | $Na_2CO_3$ | 1.5 | 1 |
| | " 33 | Methyl J-acid | 1.5 | $Na_2CO_3$ | 0.7 | 1 |
| | " 34 | Diphenyl ε-acid | 0.8 | $Na_2CO_3$ | 0.4 | 3 |
| | " 35 | Naphthalene-1,4,5,8-tetra-carboxylic acid | 5.0 | $Na_2CO_3$ | 4.0 | 6 |
| (f) | Yellow Ink Series | | | | | |
| | Comparative Example F | Not added | — | Not added | — | 8 |
| | Example 36 | ε-Acid | 0.5 | NaOH | 0.2 | 0 |
| | " 37 | Amino ε-acid | 1.0 | NaOH | 0.4 | 2 |
| | " 38 | Acetyl J-acid | 1.5 | NaOH | 0.3 | 0 |
| | " 39 | Diazo 1,2,4-acid | 5.0 | NaOH | 1.0 | 2 |
| | " 40 | Naphthalene-1,3,6-trisulfonic acid | 7.0 | NaOH | 1.4 | 4 |
| (g) | Black Ink-No. 1 Series | | | | | |
| | Comparative Example G | Not added | — | Not added | — | 9 |
| | Example 41 | R-acid | 0.8 | NaOH | 0.2 | 1 |
| | " 42 | Koch's acid | 8.0 | NaOH | 3.2 | 3 |
| | " 43 | p-Nitrobenzoyl J-acid | 0.7 | NaOH | 0.2 | 2 |
| | " 44 | 4-Nitroso-3-naphthol-2,7-disulfonic acid | 1.0 | $Na_2CO_3$ | 0.5 | 2 |
| | " 45 | 3-Hydroxy-2-naphthoic acid | 1.5 | $Na_2CO_3$ | 0.7 | 1 |
| | " 46 | Chromotropic acid | 1.5 | $Na_2CO_3$ | 0.8 | 0 |
| | " 47 | Benzoyl H-acid | 3.0 | $Na_2CO_3$ | 1.5 | 1 |
| | " 48 | Crocein acid | 0.5 | KOH | 0.1 | 2 |
| | " 49 | Dahl's acid | 2.0 | KOH | 0.5 | 4 |

Table 1-continued

| | | Compound and Amounts | | | | Results of "Ink² Swallowing Test" (no. poor/50 samples) |
|---|---|---|---|---|---|---|
| Type of Ink | | Naphthalene Derivative | (parts) | Dissolving Aid | (parts) | |
| (h) Black Ink-No. 2 Series | | | | | | |
| Comparative Example H | | Not added | — | Not added | — | 18 |
| Example | 51 | G-acid | 1.5 | KOH | 0.7 | 5 |
| " | 52 | Dioxy R-acid | 0.5 | KOH | 0.1 | 2 |
| " | 53 | p-Amino-benzoyl J-acid | 7.0 | Na$_2$CO$_3$ | 1.7 | 4 |
| " | 54 | N-p-Tolyl Peri acid | 2.0 | Na$_2$CO$_3$ | 0.5 | 2 |
| " | 55 | Naphthalene-1,8-dicarboxylic acid | 3.0 | Na$_2$CO$_3$ | 1.5 | 3 |
| " | 56 | H-acid | 1.5 | Na$_2$CO$_3$ | 0.8 | 2 |
| " | 57 | C-acid | 4.0 | Na$_2$CO$_3$ | 2.0 | 4 |
| " | 58 | NN-acid | 0.7 | LiOH | 0.1 | 1 |
| (a) Red Ink-No. 1 Series | | | | | | |
| Comparative Example A-1 | | Not added | — | Not added | — | 11 |
| Example | 59 | Oxy Koch's acid | 2.0 | NaOH | 1.2 | 1 |
| " | 60 | Dioxy G-acid | 0.5 | NaOH | 0.1 | 1 |
| " | 61 | Dimethyl γ-acid | 1.5 | NaOH | 0.3 | 0 |
| " | 62 | Phenyl Peri acid | 4.0 | NaOH | 0.8 | 1 |
| " | 63 | 2-Naphthoic acid | 3.0 | Na$_2$CO$_3$ | 0.7 | 2 |
| " | 64 | Laurent's acid | 0.5 | Na$_2$CO$_3$ | 0.1 | 0 |
| " | 65 | ε-Acid | 1.5 | Na$_2$CO$_3$ | 0.3 | 0 |
| " | 66 | Naphthionic acid | 5.0 | Na$_2$CO$_3$ | 1.2 | 2 |
| " | 67 | J-acid | 0.8 | KOH | 0.2 | 0 |
| " | 68 | SS-acid | 1.0 | KOH | 0.2 | 1 |
| " | 69 | N-Benzoyl γ-acid | 0.7 | KOH | 0.1 | 0 |
| " | 70 | H-acid Cleve's acid | 1.5 / 1.0 | KOH | 0.7 | 1 |
| (b) Red Ink-No. 2 Series | | | | | | |
| Comparative Example B-1 | | Not added | — | Not added | — | 13 |
| Comparative Example B-2 | | Naphthionic acid | 0.05 | NaOH | 0.01 | 9 |
| Example | 71 | Naphthionic acid | 0.9 | NaOH | 0.2 | 2 |
| " | 72 | Chromotropic acid | 3.0 | NaOH | 0.6 | 0 |
| " | 73 | N-p-Carboxy phenyl γ-acid | 4.0 | NaOH | 0.8 | 0 |
| " | 74 | 1,8-Naphthylene-diamine-3,6-disulfonic acid | 1.0 | KOH | 0.2 | 1 |
| " | 75 | Naphthalene-2,7-disulfonic acid | 1.5 | KOH | 0.3 | 1 |
| " | 76 | Amino R-acid | 4.0 | KOH | 0.8 | 1 |
| " | 77 | Schaffer's acid | 2.0 | KOH | 0.4 | 1 |
| " | 78 | K-acid | 2.5 | KOH | 1.2 | 0 |
| " | 79 | Tobias acid R-acid | 2.0 / 1.0 | KOH | 1.0 | 1 |
| (c) Blue Ink Series | | | | | | 42 |
| Comparative Example C | | Not added | — | Not added | — | 18 |
| Example | 80 | Laurent's acid | 0.5 | Na$_2$CO$_3$ | 0.1 | 1 |
| " | 81 | 1,2,4-acid | 0.7 | Na$_2$CO$_3$ | 0.2 | 2 |
| " | 82 | N-benzoyl γ-acid | 5.0 | Na$_2$CO$_3$ | 1.0 | 0 |
| " | 83 | 1,4-Naphthylene-diamine sulfonic acid | 1.5 | LiOH | 0.2 | 1 |
| " | 84 | 2-Hydroxy-1-naphthoic acid | 3.0 | LiOH | 0.3 | 0 |
| (d) Green Ink Series | | | | | | |
| Comparative Example D | | Not added | — | Not added | — | 17 |
| Example | 85 | Cleve's acid | 2.0 | Na$_2$CO$_3$ | 0.5 | 0 |
| " | 86 | J-acid | 0.8 | Na$_2$CO$_3$ | 0.2 | 0 |
| " | 87 | Benzoyl S-acid | 7.0 | Na$_2$CO$_3$ | 1.8 | 4 |
| " | 88 | N-p-Tolyl Peri acid | 1.5 | Na$_2$CO$_3$ | 0.4 | 1 |
| " | 89 | Naphthalene-1,3,6-trisulfonic acid | 3.0 | Na$_2$CO$_3$ | 2.0 | 1 |
| (e) Violet Ink Series | | | | | | |
| Comparative Example E | | Not added | — | Not added | — | 8 |
| Example | 90 | Peri acid | 0.5 | NaOH | 0.1 | 1 |
| " | 91 | γ-Acid | 1.0 | NaOH | 0.2 | 0 |
| " | 92 | N-Acetyl H-acid | 8.0 | NaOH | 1.6 | 0 |
| " | 93 | Phenyl Peri acid | 3.0 | NaOH | 0.6 | 0 |
| " | 94 | Ethoxy Cleve's acid | 1.5 | NaOH | 0.3 | 1 |
| " | 95 | 2-Hydroxy-2-naphthoic acid | 2.0 | NaOH | 0.4 | 0 |
| (f) Yellow Ink Series | | | | | | |
| Comparative Example F | | Not added | — | Not added | — | 17 |
| Example | 96 | Tobias acid | 1.5 | Na$_2$CO$_3$ | 0.7 | 1 |
| " | 97 | S-acid | 10.0 | Na$_2$CO$_3$ | 5.0 | 2 |
| " | 98 | N-Benzoyl H-acid | 3.0 | Na$_2$CO$_3$ | 1.5 | 0 |
| " | 99 | Ethoxychromotropic | 1.0 | Na$_2$CO$_3$ | 0.5 | 2 |

Table 1-continued

|  |  | acid |  |  |  |  |
|---|---|---|---|---|---|---|
| " | 100 | Naphthalene-2,6-disulfonic acid | 0.8 | Na₂CO₃ | 0.4 | 1 |
| (g) Black Ink-No. 1 Series |  |  |  |  |  |  |
| Comparative Example G |  | Not added | — | Not added | — | 14 |
| Example | 101 | Dahl's acid | 5.0 | KOH | 1.0 | 2 |
| " | 102 | M-acid | 1.0 | KOH | 0.5 | 0 |
| " | 103 | N-Benzenesulfonyl H-acid | 1.5 | KOH | 0.7 | 1 |
| " | 104 | Diphenyl ε-acid | 0.3 | KOH | 0.1 | 0 |
| " | 105 | β-Naphthalene-sulfonic acid | 1.0 | Na₂CO₃ | 0.2 | 5 |
| " | 106 | L-acid | 0.8 | Na₂CO₃ | 0.1 | 0 |
| " | 107 | Koch'acid | 3.0 | Na₂CO₃ | 3.0 | 1 |
| " | 108 | Freund's acid | 2.0 | Na₂CO₃ | 1.0 | 1 |
| " | 109 | N-Methyl J-acid | 1.5 | Na₂CO₃ | 0.3 | 0 |
| " | 110 | 3-Hydroxy-2-naphthoic acid | 0.5 | Na₂CO₃ | 0.4 | 3 |
|  |  | β-Naphthalene-sulfonic acid | 1.0 |  |  |  |
| (h) Black Ink-No. 2 Series |  |  |  |  |  |  |
| Comparative Example H |  | Not added | — | Not added | — | 30 |
| Example | 111 | Bronner acid | 5.0 | NaOH | 1.0 | 0 |
| " | 112 | SS-acid | 0.7 | NaOH | 0.1 | 1 |
| " | 113 | N-Benzoyl K-acid | 2.0 | NaOH | 0.8 | 0 |
| " | 114 | Diazo 1,2,4-acid | 1.5 | NaOH | 0.3 | 2 |
| " | 115 | R-acid | 0.5 | NaOH | 0.2 | 0 |
| " | 116 | Cleve's acid | 1.5 | KOH | 0.3 | 1 |
| " | 117 | 1,2,4-acid | 3.0 | KOH | 0.7 | 3 |
| " | 118 | Koch's acid | 2.0 | KOH | 1.7 | 2 |
|  |  | Naphthalene-2,6-disulfonic acid | 0.5 |  |  |  |

[1]Writing instrument: Marking pen with a plastic pen nib
[2]Writing instrument: Ball-point pen for aqueous inks As can be seen from these test results, there is a clear difference between the inks of the present invention and comparative inks which do not contain the naphthalene derivatives. Of the naphthalene derivatives, salts of Cleve's acid, amino R-acid, ε-acid, J-acid, N-acetyl J-acid, N-methyl J-acid, γ-acid, N-dimethyl-γ-acid, N-benzoyl γ-acid, N-p-carboxy γ-acid, M-acid, K-acid, N-benzoyl K-acid, N-acetyl H-acid, N-benzoyl H-acid, chromotropic acid, Laurent's acid, phenyl Peri acid, diphenyl ε-acid, Brönner acid, a 3-hydroxy-2-naphthoic acid gave the best results.

The ink of the present invention filled in a cartridge made of polyethylene proved to be effective when employed in fountain pens.

Such an effect is believed to be due to the fact that the incorporation of the naphthalene derivative in the aqueous ink increases the affinity of the ink for the plastic material, and the ink fully wets the surface of the plastic material forming the ink passage of a writing instrument.

While the invention has been described in detail and with reference to specific embodiments thereof, it will be apparent to one skilled in the art that various changes and modifications can be made therein without departing from the spirit and scope thereof.

What is claimed is:

1. An aqueous ink composition for writing instruments consisting essentially of about 1 to about 15% by weight of a water-soluble dye, about 75 to about 99% by weight of an aqueous solvent of which at least about 50% by weight is water, and about 0.1 to about 10% by weight of a naphthalene derivative of the general formula (I):

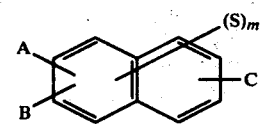
(I)

wherein S represents —SO₃M or —COOM in which M represents H, an alkali metal atom or NH₄; m is 1, 2, 3, or 4; and A, B and C, which may be the same or different, each represents —H, —OR₁,

—NO, —NO₂ or —N≡N⁺ in which R₁ and R₂, which may be the same or different, each represents —H, —C$_n$H$_{2n+1}$,

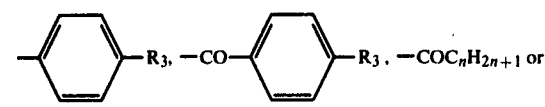

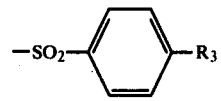

in which R₃ represents —H, —C$_n$H$_{2n+1}$, —NO₂, —NH₂, —OH or —COOH, and n is a number of 1 to 9.

2. The aqueous ink composition of claim 1, wherein the naphthalene derivative is a compound of the general formula (II):

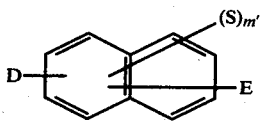

wherein S represents —SO$_3$M' or —COOM' in which M' represents H, Na or K; m' is 1 or 2; and D and E, which may be the same or different, each represents —H, —OH or

in which R$_4$ and R$_5$, which may be the same or different, each represents —H, —C$_n$H$_{2n+1}$, —COC$_n$H$_{2n+1}$,

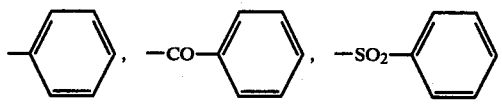

and n is a number of 1 to 9; and with the proviso that D and E both are not —H simultaneously.

3. The aqueous ink composition of claim 2, wherein said naphthalene derivative is
5-amino-1-naphthalene sulfonic acid
8-N-phenylamino-1-naphthalenesulfonic acid
5-amino-2-naphthalenesulfonic acid
6-amino-2-naphthalenesulfonic acid
3-amino-2,7-naphthalenedisulfonic acid
6,8-N,N'-Di(phenylamino)-1-naphthalenesulfonic acid
8-hydroxy-1,6-naphthalenedisulfonic acid
4,5-dihydroxy-2,7-naphthalenedisulfonic acid
7-amino-4-hydroxy-2-naphthalenesulfonic acid
7-N-acetylamino-4-hydroxy-2-naphthalenesulfonic acid
7-N-methylamino-4-hydroxy-2-naphthalenesulfonic acid
5-amino-1-hydroxy-2-naphthalenesulfonic acid
6-amino-4-hydroxy-2-naphthalenesulfonic acid
6-N-benzoylamino-4-hydroxy-2-naphthalenesulfonic acid
6-N-(p-carboxyphenyl)amino-4-hydroxy-2-naphthalenesulfonic acid
4-amino-5-hydroxy-1,7-naphthalenedisulfonic acid or
4-N-benzoylamino-5-hydroxy-1,7-naphthalenedisulfonic acid.

4. The aqueous ink composition of claim 1, wherein the amount of the water-soluble dye is 3 to 10% by weight and the amount of the naphthalene derivative is 0.3 to 7% by weight.

5. The ink composition of claim 4, wherein the amount of the naphthalene derivative is 0.5 to 3% by weight.

6. The aqueous ink composition of claim 1, wherein said aqueous ink composition additionally contains a basic substance acting as a dissolving aid for the naphthalene derivative.

7. The aqueous ink composition of claim 1, additionally containing at least one of a moisture-retaining agent, a surface active agent and an anti-mold agent.

8. The aqueous ink composition of claim 7, additionally containing at least one ink thickener.